US009226049B2

(12) United States Patent
Grandhi et al.

(10) Patent No.: US 9,226,049 B2
(45) Date of Patent: Dec. 29, 2015

(54) SYSTEM AND METHOD FOR PREVIEWING CALLS IN COMMUNICATIONS SYSTEMS

(75) Inventors: Sukeshini A. Grandhi, Kearny, NJ (US); Quentin Jones, New Brunswick, NJ (US); Richard Schuler, III, East Rutherford, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 839 days.

(21) Appl. No.: 12/604,770

(22) Filed: Oct. 23, 2009

(65) Prior Publication Data

US 2010/0158227 A1  Jun. 24, 2010

Related U.S. Application Data

(60) Provisional application No. 61/108,232, filed on Oct. 24, 2008.

(51) Int. Cl.
| | |
|---|---|
| *H04M 1/56* | (2006.01) |
| *H04Q 3/72* | (2006.01) |
| *H04M 3/42* | (2006.01) |
| *H04M 3/436* | (2006.01) |

(52) U.S. Cl.
CPC .............. *H04Q 3/72* (2013.01); *H04M 3/42042* (2013.01); *H04M 3/4365* (2013.01); *H04M 2203/2038* (2013.01)

(58) Field of Classification Search
CPC . H04M 3/51; H04M 1/6505; H04M 1/72552; H04M 3/56; H04M 3/42229; H04M 3/5175; H04M 1/274575; H04M 1/656; H04M 1/663; H04M 1/72519
USPC .......................................... 379/88.01–88.28
See application file for complete search history.

(56) References Cited

U.S. PATENT DOCUMENTS

| | | | |
|---|---|---|---|
| 6,741,689 B2 | 5/2004 | Burg | |
| 6,842,512 B2 | 1/2005 | Pedersen | |
| 6,912,521 B2 * | 6/2005 | Kraft et al. ............................ | 1/1 |
| 6,977,993 B2 * | 12/2005 | Starbuck et al. ..... | H04M 1/2478 |
| | | | 379/88.21 |
| 7,110,514 B2 | 9/2006 | Brown et al. | |
| 7,184,786 B2 | 2/2007 | Mumick et al. | |
| 7,280,652 B2 * | 10/2007 | Bocking et al. .......... | 379/355.02 |
| 8,358,762 B1 * | 1/2013 | Renner et al. ............ | 379/202.01 |

(Continued)

OTHER PUBLICATIONS

Nardi, et al., Interaction and Outeraction: Instant Messaging in Actioin, CSCW'00, Dec. 2-6, 2000, Philadelphia, PA, 10 pages.

(Continued)

*Primary Examiner* — Duc Nguyen
*Assistant Examiner* — Assad Mohammed
(74) *Attorney, Agent, or Firm* — McCarter & English, LLP

(57) ABSTRACT

A system and method for previewing calls in communications system is provided. The system includes a first communications device operated by a sender, the first communications device executing first call preview code for allowing the sender to provide relational context information relating to a call, and a second communications device operated by a receiver, the second communications device executing second call preview code for receiving the relational context information from the sender and displaying the relational context information to the receiver. The receiver can decide how to respond to the call from the sender based upon the relational context information. A plurality of user interface screens can be generated for allowing the receiver to participate in a survey relating to the call.

42 Claims, 16 Drawing Sheets

(56) References Cited

U.S. PATENT DOCUMENTS

| | | | |
|---|---|---|---|
| 2004/0091093 A1* | 5/2004 | Bookstaff | H04M 3/4874 379/201.01 |
| 2005/0169446 A1 | 8/2005 | Randall et al. | |
| 2006/0122861 A1* | 6/2006 | Scott et al. | 705/1 |
| 2006/0146995 A1 | 7/2006 | Kim | |
| 2008/0268904 A1* | 10/2008 | Tanaka | H04M 1/7253 455/556.1 |

OTHER PUBLICATIONS

Nelson, et al., Quiet Calls: Talking Silently on Mobile Phones, CHI 2001, Volume No. 3, Issue No. 1, pp. 174-181.

Pedersen, Calls.calm: Enabling Caller and Callee to Collaborate, CHI 2001, Short Talks, pp. 235-236.

Schmidt, et al., Context-Aware Mobel Telephony, SIGGROUP Bulletin, vol. 22, No. 1, pp. 19-21, 2001.

Pering, Taming of the Ring: Context Specific Social Mediation for Communication Devices, CHI 2002, Short Talk: Communication Media, pp. 712-713, 2002.

Kraut, et al., Markets for Attention: Will Postage for E-mail Help?, CSCW'02, Nov. 16-20, 2002, New Orleans, Louisiana, 10 Pages.

Siewiorek, et al., SenSay: A Context-Aware Mobile Phone, IEEE Computer Society, Proceedings of the Seventh IEEE International Symposium on Wearable Computers (ISWC'03), 2 pages, 2003.

Horvitz, et al., Models of Attention in Computing and Communication: From Principles to Applications, Microsoft Research, Redmond, Washington, 15 pages, 2003.

Horvitz, et al., BusyBody: Creating and Fielding Personalized Models of the Cost of Interruption, Letters Chi, vol. 6, Issue e, pp. 507-510, 2004.

Fogarty, et al., Presence Versus Availability: The Design and Evaluation of a Context-Aware Communication Client, pp. 1-21, 2005.

Ho, et al., Using Context-Aware Computing to Reduce the Perceived Burden of Interruptions from Mobile Devices, CHI 2005, Papers: Interruptioins and Attention 2: Attentind to Interruptioins, Apr. 2-7, 2005, pp. 909-918.

Fogarty, et al., Examining Task Engagement in Sensor-Based Statistical Models of Human Interruptibility, CHI 2005, Apr. 2-7, 2005, pp. 331-340.

Iqbal, 'et al., Towards an Index of Opportunity: Understanding Changes in Mental Workload during Task Execution, CHI 2006, Papers: Take a Number, Stand in Line (Interruptions & Attention 1), Apr. 2-7, 2006, pp. 311-320.

Wiberg, et al., Managing Availability: Supporting Lightweight Negotiations to Handle Interruptions, ACM Transactions on Computer-Human Interaction, vol. 12, No. 4, Dec. 2005, pp. 356-387.

Horvitz, et al., Bayesphone: Precomputation of Context-Sensitive Policies for Inquiry and Acdtion in Mobile Devices, UM 2005, LNAI 3538, pp. 251-260, 2005.

Khalil, Context-Aware Telephony and Its Users: Methods to Improve the Accuracy of Mobile Device Interruptions, Submitted to the faculty of the University Graduate School, Doctor of Philosphy in the Department of Computer Science, Indiana University, Apr. 2006, 184 pages.

Dabbish, Coordinating Initiation and Response in Computer-Mediated Communication, Human-Computer Interaction Institute, School of Computer Science, Carnegie Mellon University, Pittsburgh, PA, CMU-HCII-06-108, Dec. 2006, 206 pages.

Avrahami, et al., Improving the Match Between Callers and Receivers: A Study on the Effect of Contextual Information on Cell Phone Interruptions, Behaviour & Information Technology, vol. 26, No. 3, May- Jun. 2007, pp. 247-259.

PCT International Search Report dated Dec. 15, 2009.

\* cited by examiner

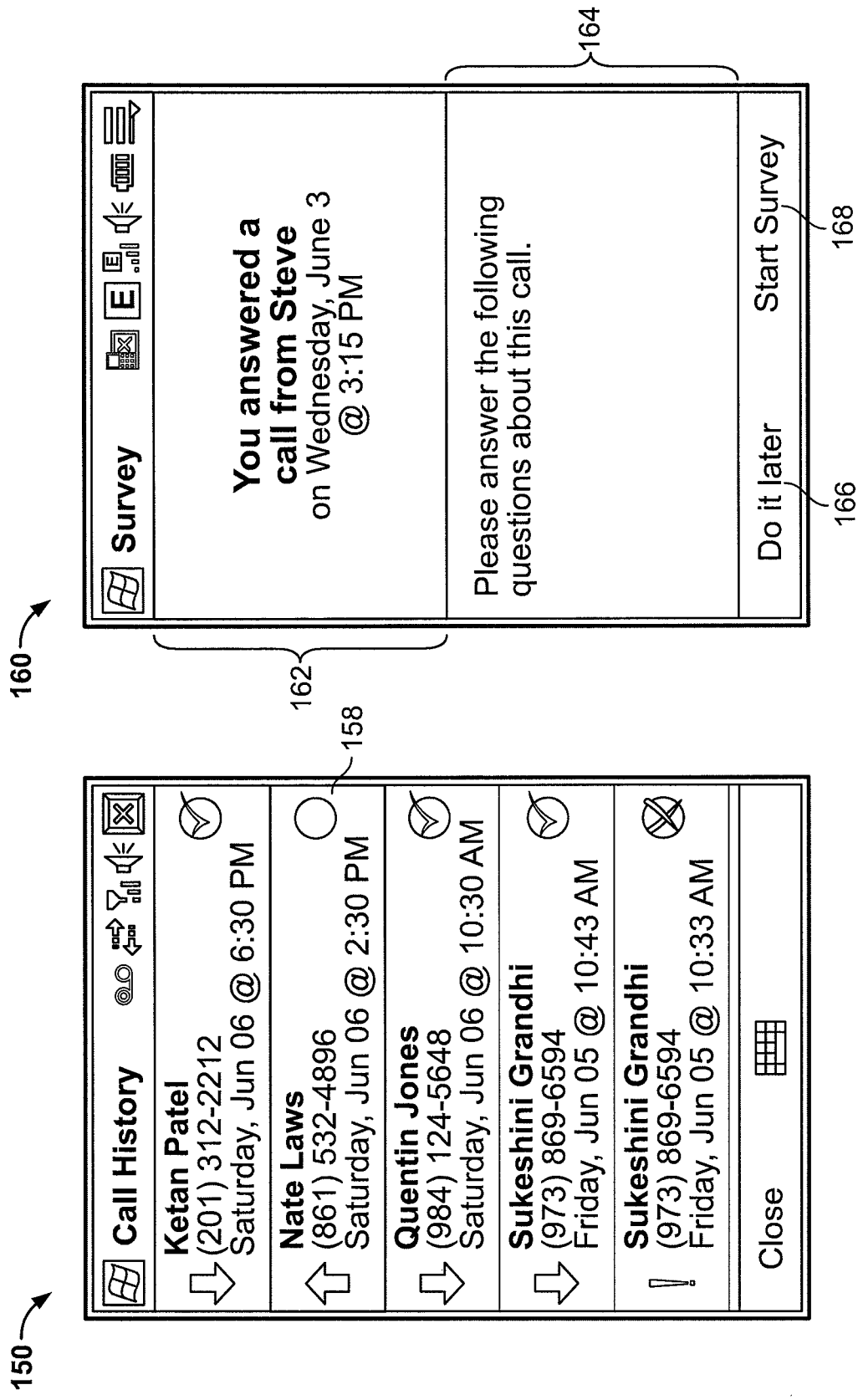

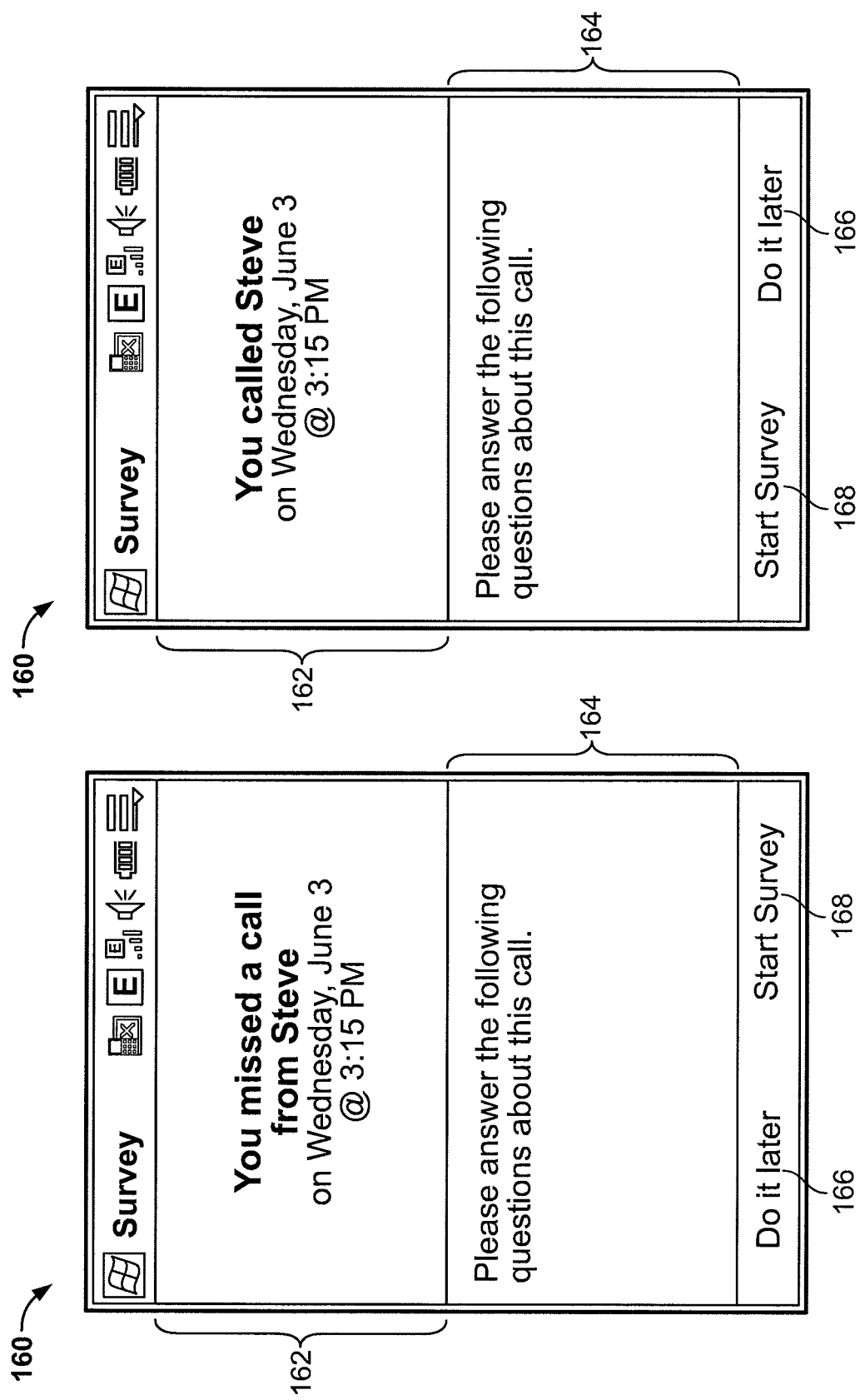

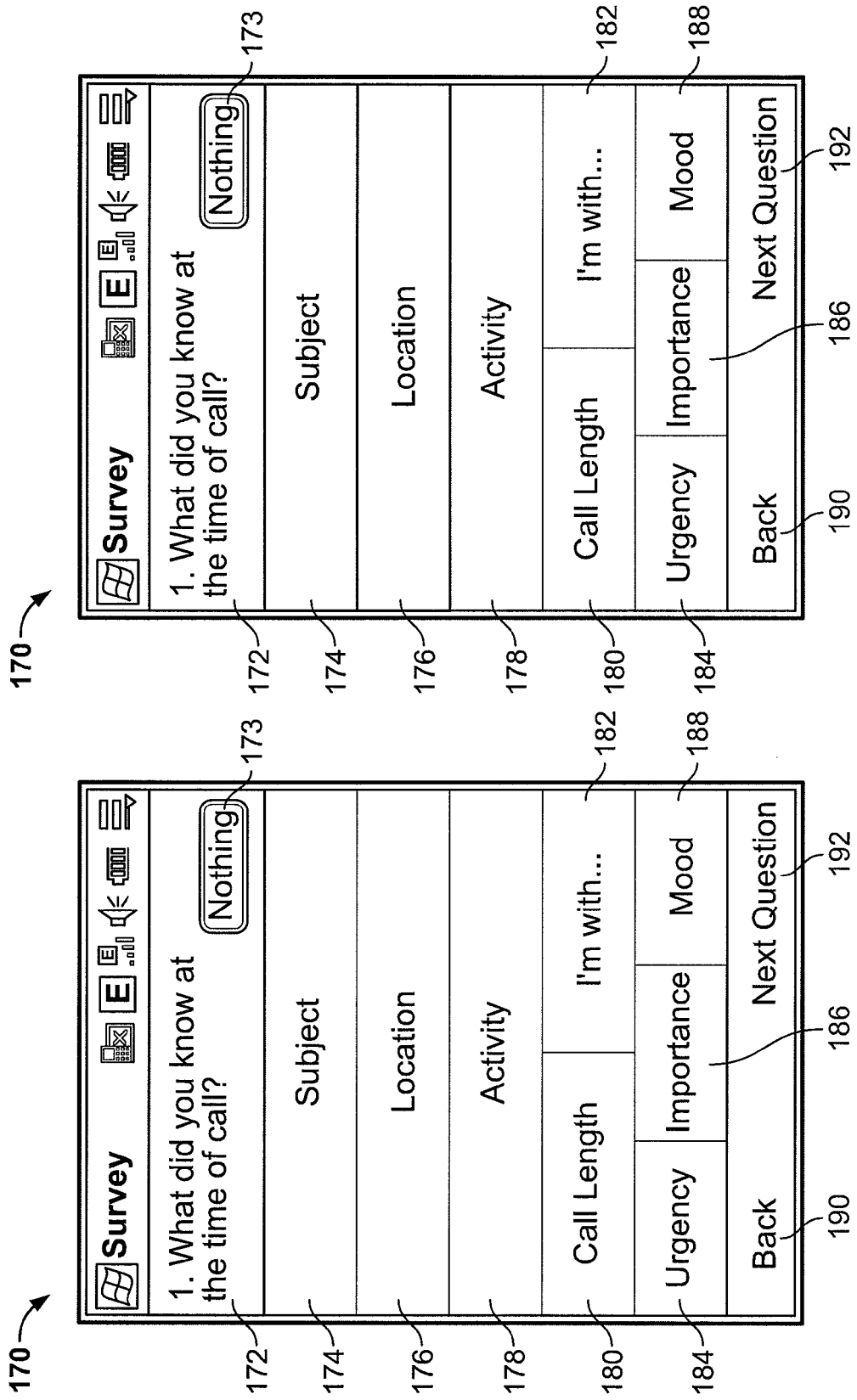

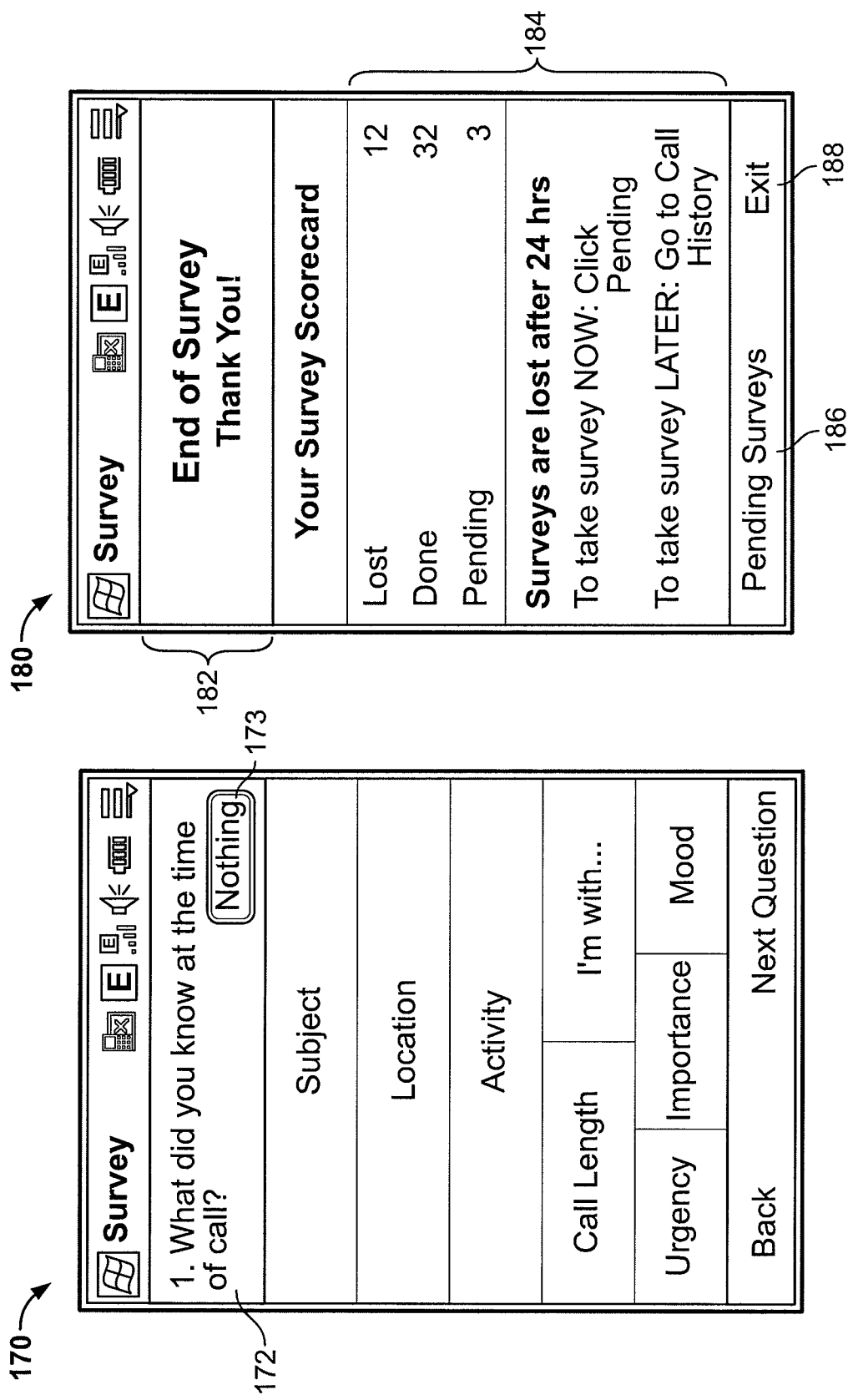

SYSTEM AND METHOD FOR PREVIEWING CALLS IN COMMUNICATIONS SYSTEMS

RELATED APPLICATIONS

This application claims the benefit of U.S. Provisional Patent Application Ser. No. 61/108,232 filed on Oct. 24, 2008, the entire disclosure of which is expressly incorporated herein by reference.

STATEMENT OF GOVERNMENT INTERESTS

The present invention was made with support from the U.S. Government under National Science Foundation Contract Nos. CNS 0454081 and IIS 0534520. Accordingly, the Government has certain rights in the present invention.

BACKGROUND OF THE INVENTION

1. Field of the Invention

The present invention relates to electronic communications systems. More specifically, the present invention relates to a system and method for previewing calls in communications systems.

2. Related Art

In today's society, the abundance of technology-mediated communications systems/devices, such as the now ubiquitous cell phone, as well as pagers, text messages, etc., has increased not only the ability to communicate, but also the possibility of being interrupted. Quite often, users of such systems are interrupted by calls from various individuals. While existing communications equipment permits identification of a caller before a call is taken, such information is often insufficient for a recipient to make an informed decision as to whether to take the call, and hence, accept the interruption. As a result, there is currently an increased research focus on technology for managing such interruptions. For example, interruption management has focused on systems that make use of different interruption management strategies such as deferral, negotiation, collaborative, availability awareness, and notification.

A drawback to existing interruption management techniques is that they do not provide users of communications devices with sufficient information to make an informed decision as to whether to accept a call. For example, they do not provide an interruptee with sufficient information relating to relational context information, which encompasses people's preferences and biases of the relationship between the interrupter and interruptee (who), as well as factors relating to the interruption that vary with each interrupter (what and why). Accordingly, what is needed, but has not yet been provided, is a system and method for previewing calls in communications systems, which provides rich information to an interruptee to allow the interruptee to more efficiently and accurately manage incoming calls.

SUMMARY OF THE INVENTION

The present invention relates to a system and method for previewing calls in communications system. In one embodiment, the present invention relates to a system for previewing calls in a communications system. The system includes a first communications device operated by a sender, the first communications device executing first call preview code for allowing the sender to provide relational context information relating to a call; and a second communications device operated by a receiver, the second communications device executing second call preview code for receiving the relational context information from the sender and displaying the relational context information to the receiver, wherein the receiver can decide how to respond to the call from the sender based upon the relational context information. The system can also generate a plurality of user interface screens for allowing the receiver to participate in a survey relating to the call.

In another embodiment, the present invention relates to a method for previewing calls in a communications system. The method includes the steps of displaying a first user interface screen on a first communications device operated by a sender in a communications network; allowing the sender to provide relational context information relating to a call using the first user interface screen; initiating a call between the sender and a receiver in the communications network; transmitting the relational context information to a second communications device operated by the receiver; displaying the relational context information to the receiver in a second user interface screen generated by the second communications device; and allowing the receiver to decide how to respond to the call based upon the relational context information.

In another embodiment, the present invention relates to a computer-readable medium holding computer executable instructions that, when executed by a processor, cause a communications device to execute the steps of: receiving relational context information from a sender in a communications network relating to a call; and displaying the relational context information in a user interface screen on the communications device. The receiver can decide how to respond to the call based upon the relational context information.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for previewing calls in communications systems, as discussed in detail below in connection with FIGS. 1-8. The term "call," as used herein, includes, but is not limited to, telephone calls, text messages, or any other type of electronic communication that is initiated with an intention to engage the receiver in a synchronous or near synchronous communication, such that the present invention provides a preview of such communication to a recipient.

Figure 1:
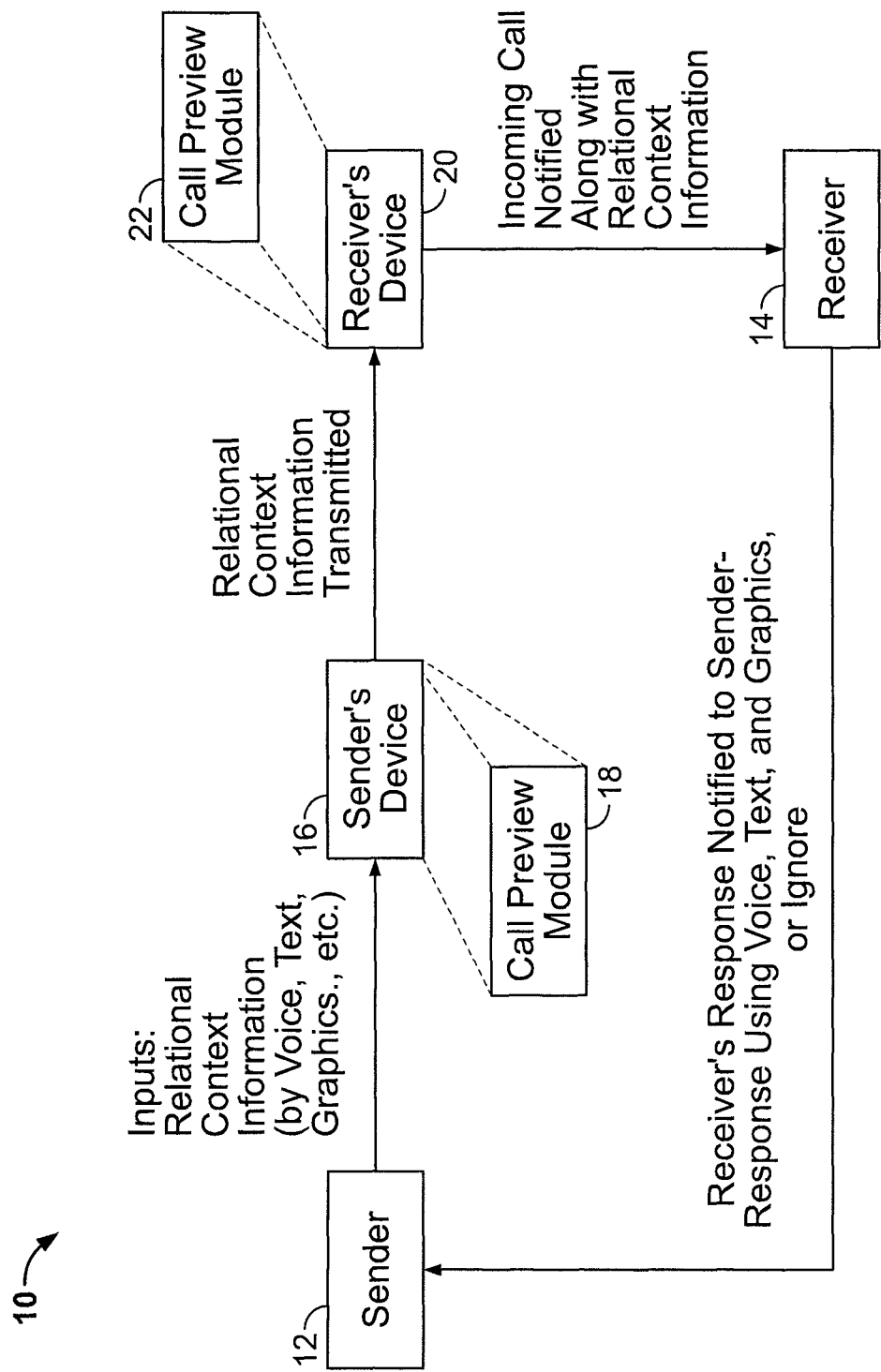
FIG. 1 is a diagram showing a system according to the present invention for previewing calls using sender and receiver devices.

FIG. 1 is a diagram showing a system according to the present invention, indicated generally at 10, for previewing calls in a communications system. The communications system includes a sender 12 and a receiver 14, and sender and receiver devices 16, 20 operated by the sender 12 and receiver 14, respectively. The devices 16, 20 could be any suitable wired or wireless communications devices, including, but not limited to, cellular telephones, smart phones (i.e., cellular telephones containing a microprocessor running a computer operating system, such as Windows® Mobile, etc.), personal digital assistants (PDAs), laptop computers, desktop computers, etc. The devices 16, 20 could be in communication with each other using any suitable communications network, such as a wired or wireless communications network (e.g., a cellular wireless network (operating one or more suitable communications protocols, such as GPRS, GSM, EDGE, EVDO, 1xRTT, CDMA, CDMA2000, TDMA, OFDMA, etc.), a wireless computer network (operating one or more suitable communications protocols, such as IEEE 802.11 (WiFi), WiMAX, Bluetooth®, etc.), a wired computer network (e.g., an Ethernet® LAN, a WAN, the Internet, etc.)). The devices 16, 20 each includes a computer-readable medium, discussed below, which stores call preview software modules 18, 22, respectively. The modules 18, 22 comprise code executable by the devices 16, 20 to provide the call preview functions described herein.

As shown in FIG. 1, the sender 12 can provide relational context information prior to placing a call, using graphical user interface screens generated on the sender's device 16 by the call preview module 18. Such information can include, but is not limited to, voice information, text information, graphics, etc., and relates to context information about the sender 12. For example, as discussed hereinbelow in greater detail, the relational context information could include, but is not limited to, the caller's identification, a short description of the call subject, the caller's location, an activity the caller is currently engaged in, the anticipated length of the call, an indication of the urgency of the call, an indication of the importance of the call, an indication of the caller's mood, and/or information about individuals surrounding or near the caller. Also, the relational context information could include interrupter-interruptee interaction history information that can be gathered from previously recorded/captured data, such as the typical length of a call for a given caller, typical time of a call, typical location, typical reason for a call, etc. The relational context information, once entered by the sender 12, is transmitted from the sender's device 16 to the receiver's device 20 over the communications network, along with the call.

The context information transmitted to the receiver's device 20 is displayed in a graphical user interface screen on the user's device 20 by the call preview module 22. Using this information, the receiver 14 can decide how to respond to the call; that is, whether to accept the call, ignore it, or to send a response to the sender 12 in any desired format (e.g., voice, text, graphics, etc.). For example, the receiver 14 can send a message back to the sender 12 acknowledging receipt of the call, but indicating to the sender 12 that the receiver 14 will call the sender 12 back at a more convenient time. The rich context information provided by the present invention allows for interruptions to be managed efficiently by the receiver 14.

Figure 2:
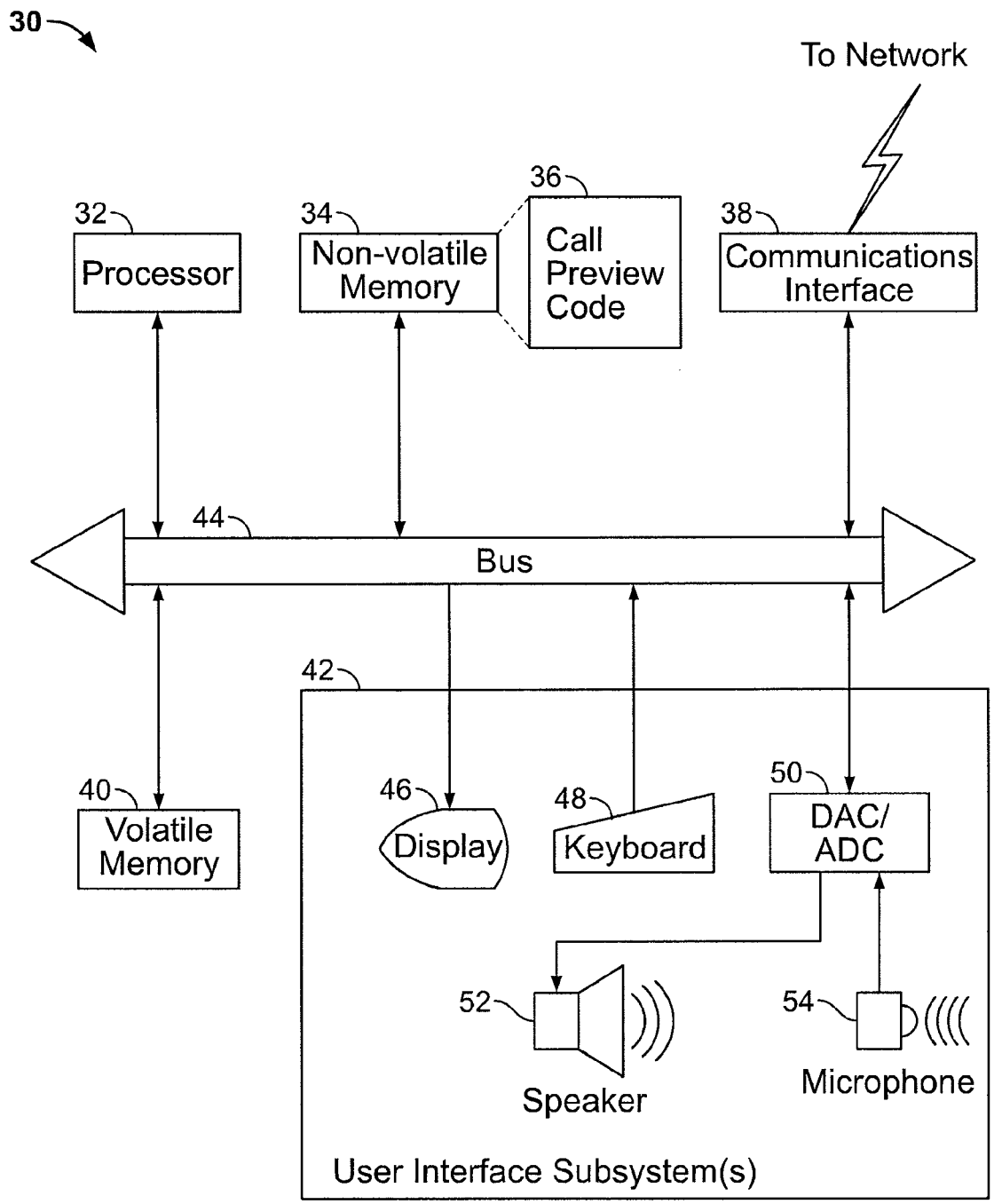
FIG. 2 is a diagram showing hardware and software components of a communications device in which the present invention can be implemented.

FIG. 2 is a diagram showing hardware and software components of a sample communications device 30 in which the present invention could be implemented. The device 30 could be utilized as the sender and/or receiver devices 16, 20 of FIG. 1, and could include a processor 32 (which could be a microprocessor, microcontroller, etc.), a non-volatile memory 34, a communications interface 38, a volatile memory 40, and one or more user interface subsystems 42. Each of these components can communicate with each other using a bus 44. The non-volatile memory 34 includes any suitable, computer-readable medium, such as a hard disk, flash memory, memory card, EPROM, EEPROM, USB flash drive, SIM card, etc. The memory 34 stores call preview code 36, which, when executed by the processor 32, performs the functions of the present invention for previewing calls. Such code 36 corresponds to the call preview modules 18 or 22 of FIG. 1. The communications interface 38 could comprise any suitable wired or wireless transmitter/receiver for communicating with a network, as discussed above in connection with FIG. 1. The non-volatile memory 40 could comprise any suitable, high-speed memory such as RAM, DRAM, etc. It is noted that the processor 32 and memories 34, 40 could be substituted with a field-programmable gate array (FPGA), or any other suitable type of programmable device.

The user interface subsystem(s) 42 could include any suitable device/subsystem for allowing interaction with a user, such as a display 46, a keyboard 48, and/or a digital-to-analog/analog-to-digital converter (DAC/ADC) for allowing audio communication via a speaker 52 and a microphone 54. Such components commonly exist in cellular telephones/smartphones, and indeed, the communications device 30 could be a cellular telephone or a smartphone. It is also noted that the call preview code 36 could be programmed in a suitable programming language, such as C, C++, Java, etc.

Figure 3:
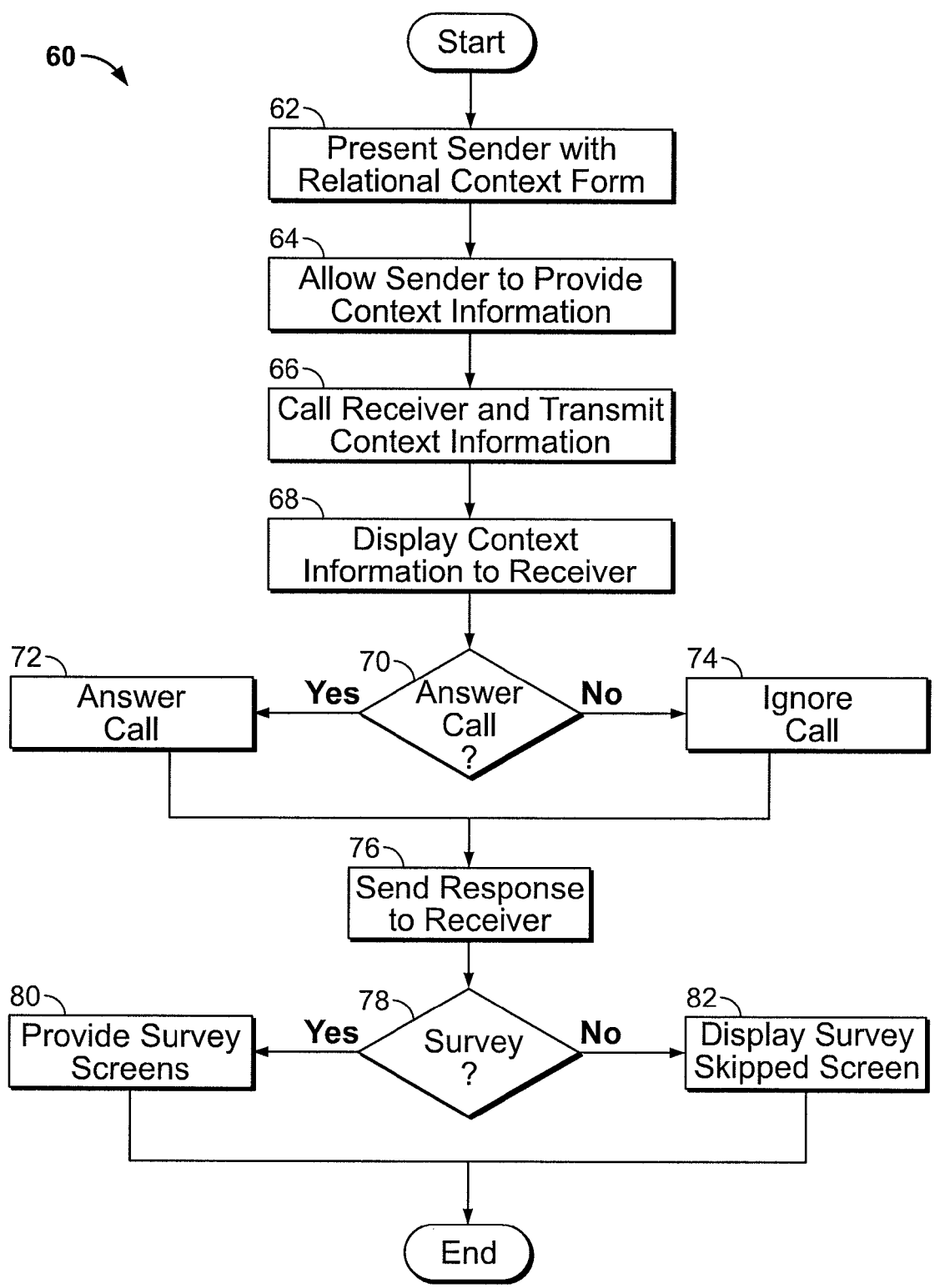
FIG. 3 is flowchart showing processing steps according to the present invention for previewing calls in communications systems.

FIG. 3 is flowchart showing processing steps according to the present invention, indicated generally at 60, for previewing calls in communications systems. In step 62, the sender in a communications network is presented with one or more relational context user interface input forms on his or her communications device. Then, in step 64, the sender inputs the context information into the one or more forms. The types of relational context information that could be captured are discussed hereinbelow in greater detail. In step 66, once the relational context information has been input by the user, a desired receiver in the communications network is called by the sender's device. Additionally, the relational context information provided by the sender is transmitted to the receiver's communications device.

In step 68, the relational context information is displayed in the one or more graphical user interface screens generated by the receiver's communications device. In step 70, the receiver can decide whether to answer the call. Such a decision is greatly facilitated by the relational context information that is displayed by the receiver's communications device. If a positive determination is made, step 72 occurs, wherein the receiver answers the call. Otherwise, step 74 occurs, wherein the receiver ignores the call. In step 76, the receiver's response (e.g., whether the receiver answered the call) is transmitted back to the sender's device. Also, in step 76, the receiver can generate a customized response to be transmitted to the sender, which could include voice, text, or graphical information. In step 78, the receiver is provided with a screen allowing the user to specify whether or not to her or she desires to participate in a survey relating to the call. If a positive determination is made, step 80 occurs, wherein the receiver is provided with one or more graphical user interface screens for allowing the receiver to participate in the survey. Otherwise, step 82 occurs, wherein a screen is displayed to the receiver indicating his or her desire to skip the survey.

Figures 4A, 4B:
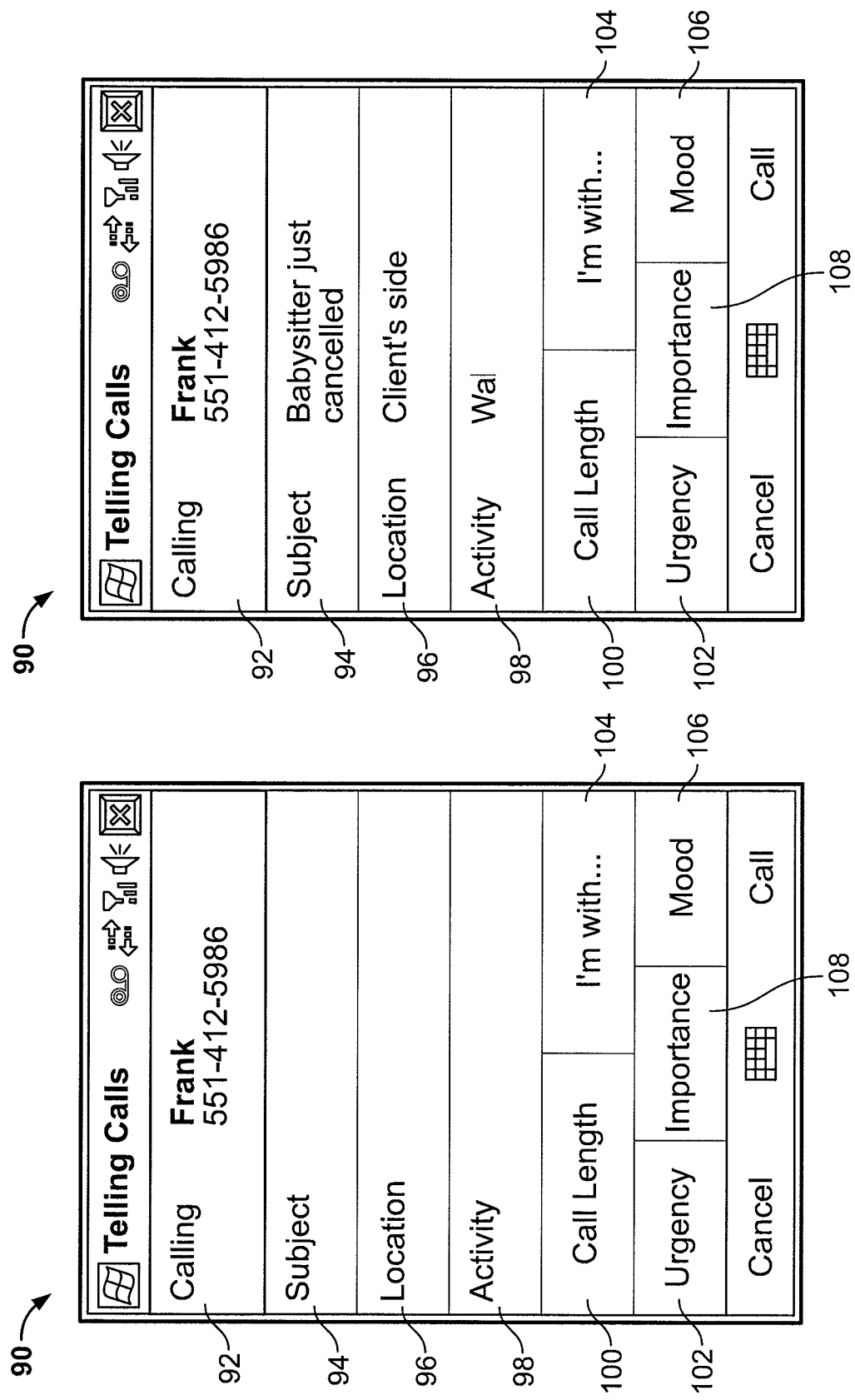
FIGS. 4A-4Q are screenshots showing sample user interface screens generated by the present invention for previewing calls.
Figures 4C, 4D:
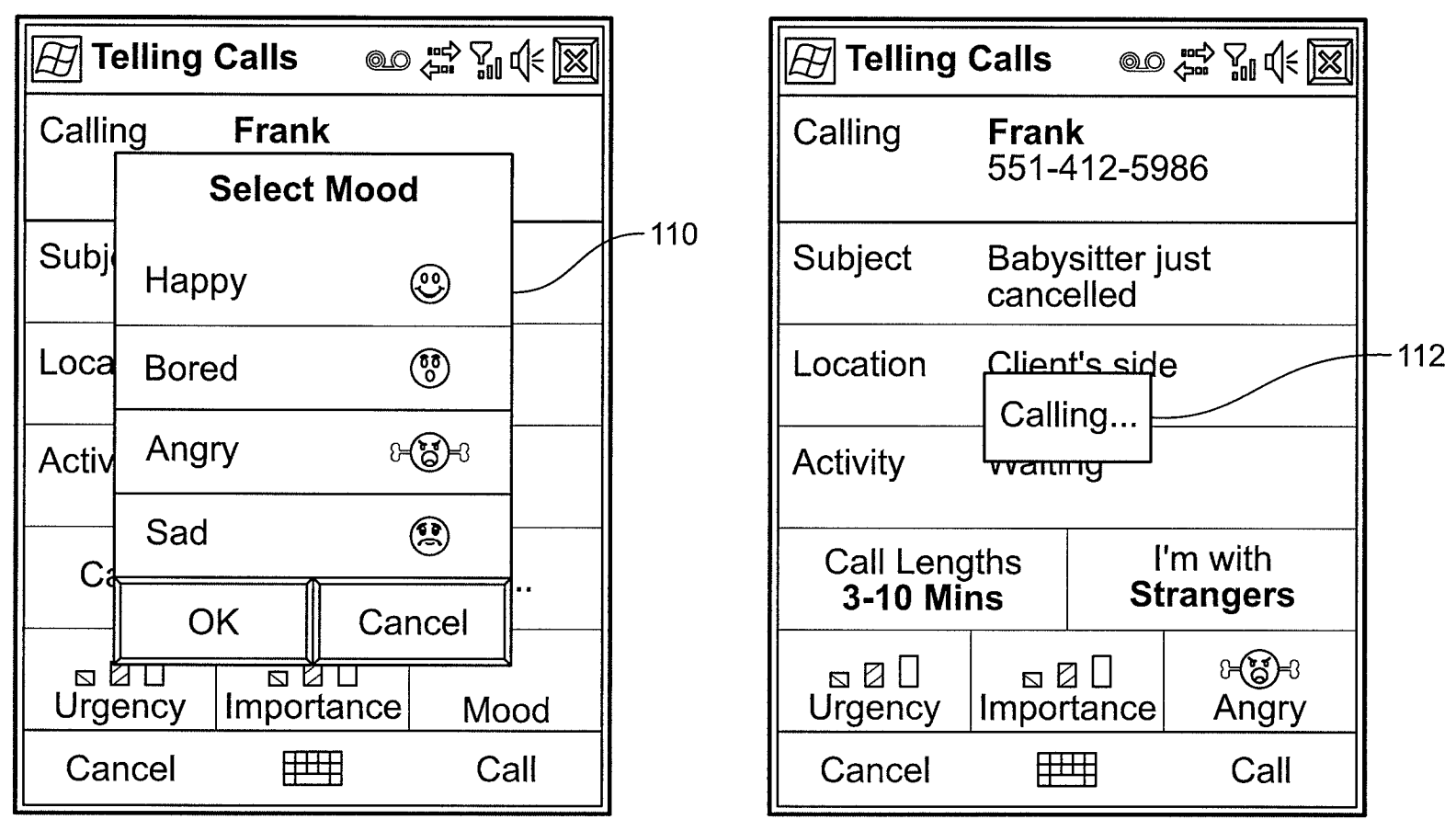
Figures 4E, 4F:
Figure 4H:
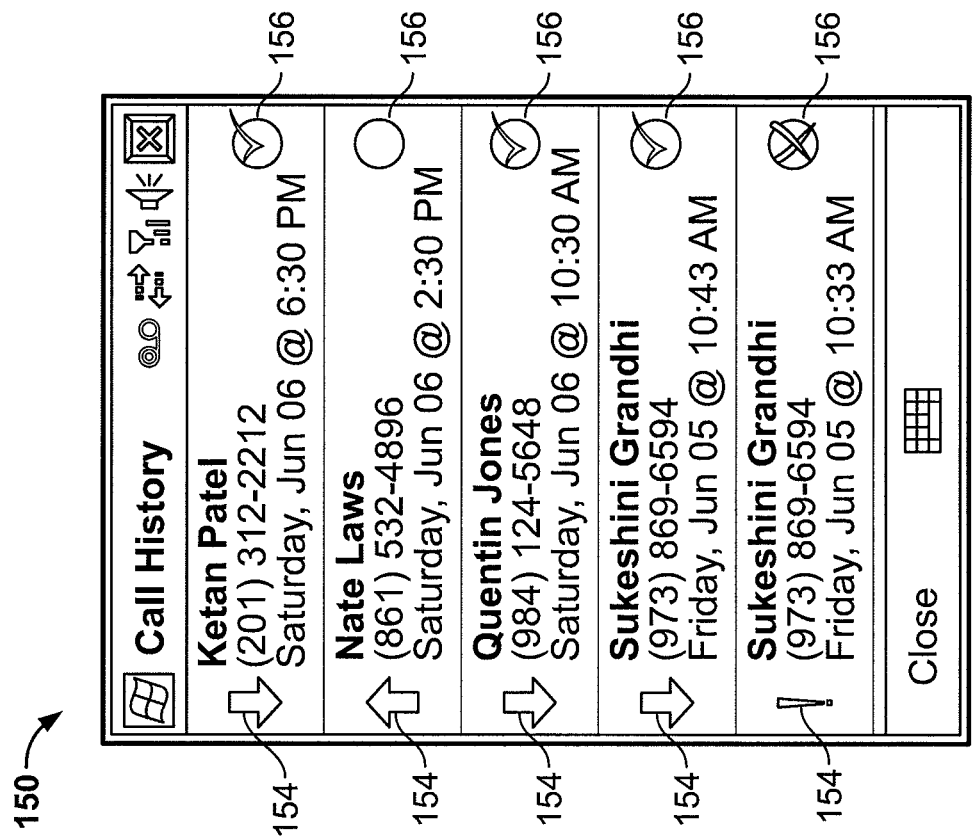
Figure 4G:
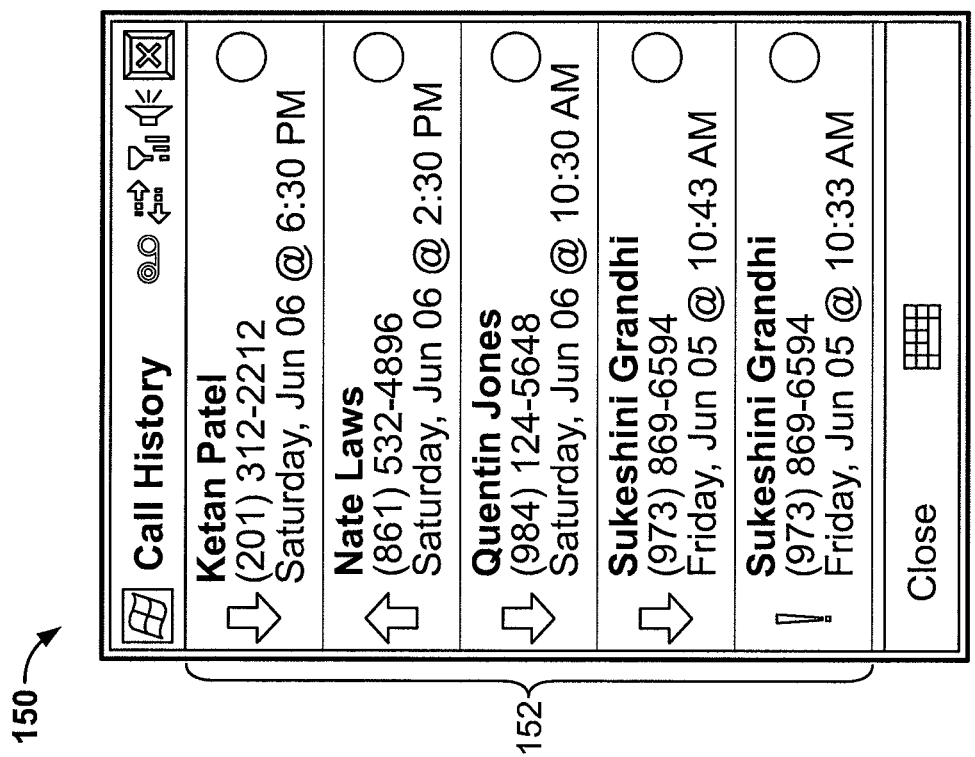
Figure 4Q:
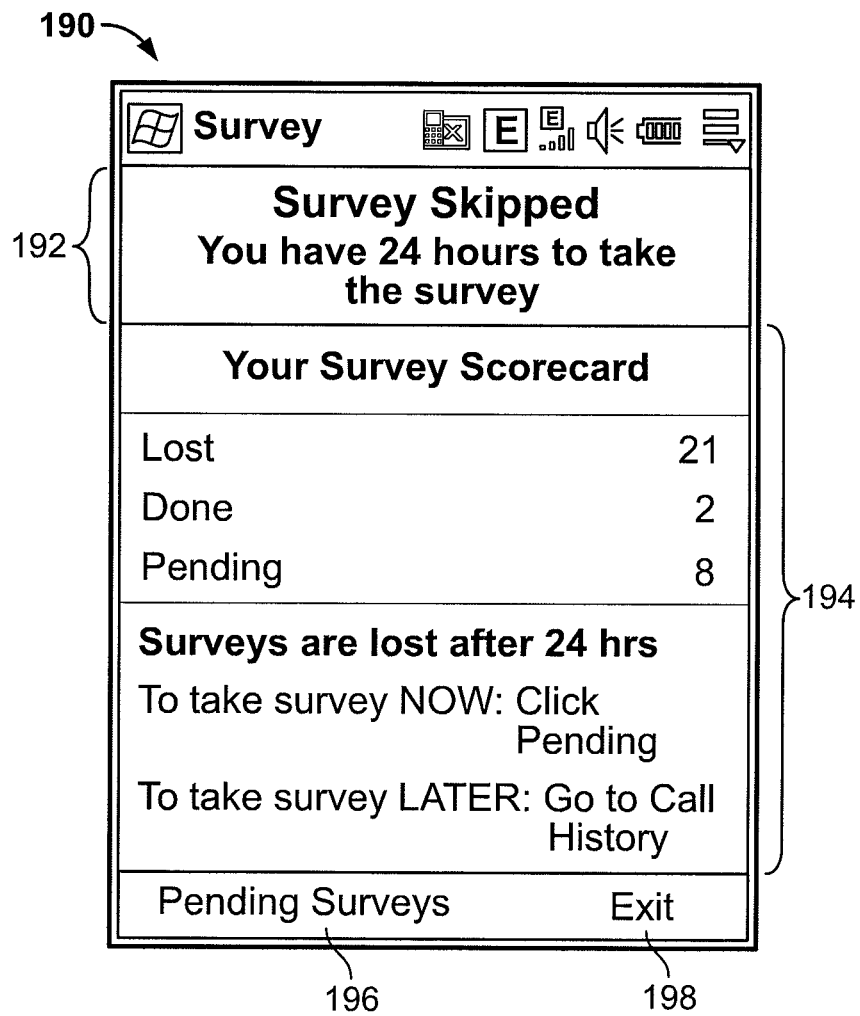

FIGS. 4A-4Q are screenshots showing sample user interface screens generated by the present invention for previewing calls. More specifically, FIGS. 4A-4D show a sample user interface screen 90 generated by the present invention for allowing a sender to provide relational context information to be transmitted to a receiver. The screen 90 is displayed on the sender's device, and includes fields 92-98 for allowing the sender to identify his/herself (field 92), to provide a short description of the subject of the call (field 94), to provide a description of the sender's current location (field 96), and to provide a short description of an activity that the sender is currently engaged in (field 98). Also, screen elements 100-106 allow the sender to specify the anticipated call length, an indication of the urgency of the call, an indication of the importance of the call, a description of people surrounding or near the sender, and the sender's current mood. The unfilled screen 90 is shown in FIG. 4A, and data entry into the screen 90 is shown in FIG. 4B. As shown in FIG. 4C, a separate screen 110 is provided for allowing the user to specify his or her mood through the use of emoticons. As shown in FIG. 4D, once the relational context information is provided by the sender, a call is initiated, and the call progress is shown in screen element 112.

FIGS. 4E-4F are screenshots of a graphical user interface screen 120 generated by the present invention and displayed on the receiver's device, for allowing the receiver to view the relational context information provided by the sender. The screen 120 displays the relational context information in fields 122-128, which include a description of the sender (including his/her name and telephone number), the subject of the call, the sender's location, and the sender's current activity. Also, screen elements 130-138 display information about the anticipated call length, the urgency and importance of the call, the sender's current mood, and individuals surrounding or near the sender. As shown in FIG. 4F, while the relational context information is being transmitted to the receiver's device, a dialog box 142 could be displayed to indicate that data transmission is taking place.

FIGS. 4G-4I are screenshots of a graphical user interface screen 150 generated by the present invention for allowing a receiver to manage calls and associated relational context information. The screen 150 includes a list 152 that provides a history of calls received by the receiver's device. As shown in FIG. 4H, screen elements 154 display whether the call was answered or ignored by the receiver, as well as calls that were indicated by the sender as being urgent (by displaying an exclamation point). Also, checkboxes 156 are provided for allowing the receiver to specify whether to receive future calls from the associated senders, or to ignore them by default. Such a feature is useful in managing interruptions (e.g., unwanted calls) by undesired senders. As shown in FIG. 4I, the receiver can access information about a specific caller (sender) by clicking on the field 158 associated with the caller.

FIGS. 4I-4L are screenshots showing a user interface screen 160 generated by the present invention for allowing the receiver to access information about a sender, and to participate in a survey relating to a call. The screen 160 includes a region 162 for displaying information about the sender, such as the sender's name, the time of the sender's call, and whether the receiver answered the call, missed the call, or called the sender. Screen region 164 allows the receiver to answer questions relating to the call. Then, the user can click the button 168 to start the survey, or click the button 166 to participate in the survey at a later point in time.

FIGS. 4M-4O are screenshots showing a user interface screen 170 generated by the present invention for allowing a receiver to participate in a survey relating to a call. The receiver can click on fields 172-178 to specify whether the user was provided with relational context information by the sender relating to the subject of the call, the sender's location, and an activity in which the sender was engaged when making the call. Also, the receiver can click on fields 180-188 to specify whether the user was provided with relational context information by the sender relating to the length of the call, the urgency and importance of the call, the caller's mood, and an the identities of individuals surrounding or near the caller. Also, if no relational context information was provided by the sender, the receiver can click on the "nothing" button 173. Further, the receiver can click on buttons 190, 192 to navigate between questions forming part of the survey.

FIGS. 4P-4Q are screenshots showing a user interface screens 180, 190 generated by the present invention for displaying survey results to the receiver. The screen 180 includes a region 182 for indicating the end of the survey and thanking the receiver for his/her participation, and a region 184 for displaying information about the survey, such as the number surveys that the receiver completed, the number of surveys which were lost, and the number of pending surveys. Using the buttons 186 and 188, the receiver can access pending surveys, or exit the screen 180. The screen 190 includes a region 192 for indicating that the receiver declined to participate in the survey, and a region 194 for displaying information about the survey, such as the number of surveys that the receiver completed, the number of surveys which were lost, and the number of pending surveys. Using the buttons 196 and 198, the receiver can access pending surveys, or exit the screen 190.

Figure 5:
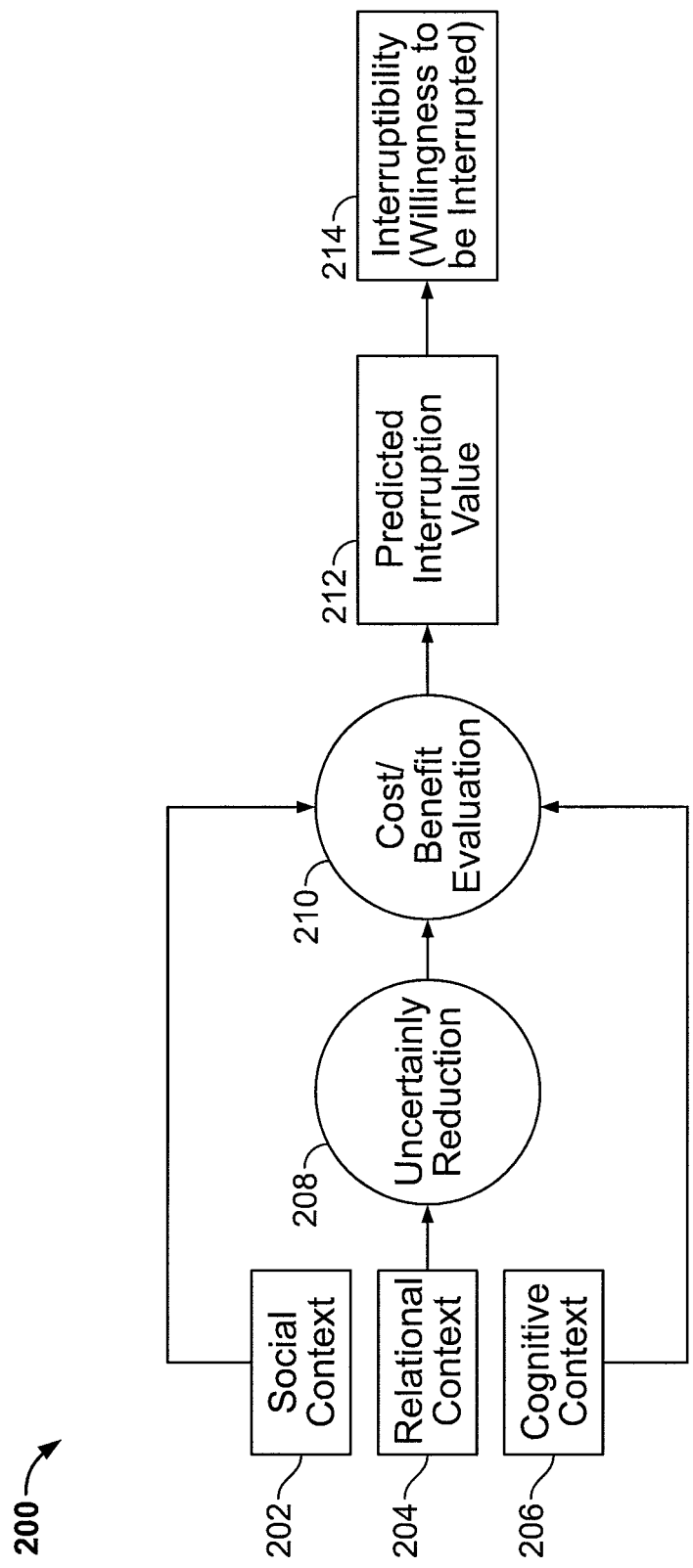
FIG. 5 is a diagram showing a model according to the present invention for predicting the value of an interruption.
Figure 6:
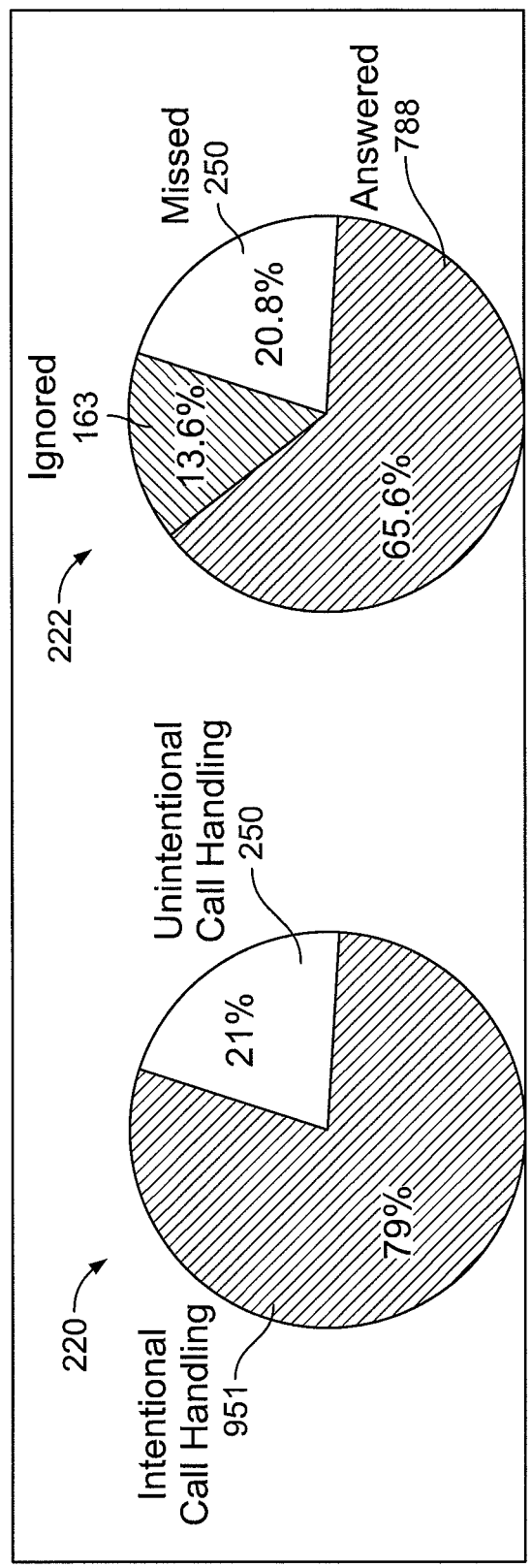
FIGS. 6-8 are charts showing results of an experiment conducted using the present invention.

FIG. 5 is a diagram showing a model according to the present invention, indicated generally at 200, for predicting the value of an interruption. The model 200 takes as input social context information 202, relational context information 204, and cognitive context information 206. An uncertainty reduction process 208 occurs, wherein users ask questions of each other to reduce uncertainty (e.g., using the interface screens shown and described above in connection with FIGS. 4A-4Q). Then, in step 210, a cost/benefit evaluation takes place. Then, in step 212, a predicted interruption value 212 is generated. The interruption value 212 is utilized in step 214 for determining a user's interruptability, that is, the user's willingness to be interrupted. The model 200 is incorporates Uncertainty Reduction theory, which states that high levels of uncertainty between strangers' prompts them to ask questions of each other thereby reducing uncertainty, and Predicted Outcome Value theory, which posits that the motivation to interact is governed by a desire to maximize relational outcomes rather than uncertainty reduction. These theories provide insight on how individuals interpret and respond to an interruption. Uncertainty reduction can be viewed as a process that can help individuals maximize the prediction of the outcome value of an interruption. While the social and cognitive context is known to the interruptees, they typically have limited knowledge of the relational context (who, what, etc.). Therefore, individuals engage in the process of uncertainty reduction to predict the value of an interruption. The model 200 takes into account the fact that individuals engage in uncertainty reduction as means to predict the value of an interruption and that this in turn influences their willingness to be interrupted. It also can be utilized to determine how richer information on relational context can enhance one's cognitive and social interruptability decision making.

When individuals are interrupted by a technology-mediated request for interpersonal communication, as rational actors, they attempt to predict the interruption's value. The Predicted Interruption Value (PIV) 212, discussed above, is the result of a cost/benefit evaluation in step 210 for the best course of action in response to the interruption, based on cognitive, social, and relational context. While individuals are aware of their own cognitive and social context, their knowledge of the relational context is to some extent unknown. As a result, they will typically try to reduce uncertainty regarding the relational context to derive the PIV.

Three categories of relational context factors are of particular importance to the model 200, and are processed by the present invention: 1) interrupter-related information which comprises factors such as who the interruption is from, his or her activity, location, mood, and the nature of relationship with people in the location; 2) interruption content which comprises factors such as what the interruption is about (analogous to subject fields in emails), how long it may last, and its urgency/importance; and 3) interrupter-interruptee interaction history which comprises factors such as how often, for how long, what times the interrupter interrupts, and how many attempts were previously made.

The relational factors identified above vary with each interruption and the knowledge of these factors influences the interruptee's response to an interruption. However, in current CMC systems, the relational context knowledge is limited or non existent leading to uncertainty around an incoming interruption as discussed below.

Interrupter Related Information:

Uncertainty around interrupter's context in CMC comes from factors such as who the interrupter is and his or her social and cognitive context. Currently, identity of the interrupter is limited to information on interrupter identification (ID) in terms of numbers, names, usernames and email addresses. While relationships and affinities to the interrupter are not explicitly provided, they are implicitly derived in the interruptee's mind based on the interrupter's ID information. The implicit derivation however is based on the premise that the user ID presented is that of the person(s) having ownership or user rights to the communication device. The case of multiple users increases the level of uncertainty on who the interrupter is. As far as computer-mediated interrupter's social or cognitive context factors are concerned, currently the interrupter's context while initiating an interruption in terms of the location/place, people in place and social/cognitive activity, mood is not captured to be presented to the interruptees. Some level of uncertainty is reduced if the interruption is via a non-mobile communication device as one can assume that the person is calling from where the device is located. Micro details such as who they are with, their mobility, current task, and scheduled activities can help in reducing uncertainty further.

Interruption Content:

Uncertainty from on interruption content can arise from lack of knowledge on factors such as importance/urgency of the interruption and length of interruption. Often, importance/urgency as perceived by the interrupter is conveyed when engaged in the interruption itself and is rarely communicated ahead of the interruption. Typical asynchronous communication systems such as emails and voicemails allow for the urgency level to be conveyed. Anecdotal experiences shows that individuals can infer urgency/importance based on communication history patterns of the sender such as frequency of and time of day interactions on certain communication media. Some interruptions may be considered important/urgent based on regular communication patterns, for example, a mother who receives a call every evening at 9 pm from her son who is overseas. Alternatively, a break in routine communication patterns may be inferred as important, such as an early morning call from a person who rarely calls at that time maybe be perceived as important/urgent. These scenarios highlight that importance/urgency of an interruption currently is implicitly derived or understood or misunderstood. As far as knowing what an interruption is about, it is difficult to know for sure until it is engaged in. However some communication systems like emails allow for a subject line/tag that is synonymous to a headline of a news story. This allows for reduced uncertainty for the receiver by enabling him/her to gauge the value of engaging in the interruption.

Interrupter-Interruptee Interaction History:

Interaction patterns such as emails, text messages or phone logs that include times at which they are received and how long they last, etc., can be obtained based on the design capability of the device in question. Currently, aggregated/meta information on interaction patterns such as frequency of interruptions, average length, usual times of interruptions are not available explicitly unless actively sought or implied by the user.

Knowledge of the foregoing three kinds of relational factors discussed, as captured by the present invention, reduces the uncertainty around an interruption leading to a more accurate prediction of the interruption value. The issues of uncertainty raised here are particularly relevant to current cell phone communication where the relational context information provided for incoming calls is limited to the identity of the caller (in other synchronous communications technology such as land phones one could deduce place in which the caller is and/or her related activity the place). This can be addressed by leveraging social network and/or location data to provide richer information to the interruptee, or by providing mechanisms for the capture and presentation of information such as call reason, importance and urgency to the interrupter.

The value of an interruption is defined as a net result of perceived costs and perceived benefits of an interruption. However, the model 200 shows that the costs and benefits are perceived based not simply on the social and cognitive factors as predominantly considered in previous paradigms but also on relational factors such as interrupter's context, interruption content and history of interrupter-interruptee interaction patterns. Thus, the PIV at time t is defined as:

$$PIV(t) = \sum_{i=1}^{l}\left(\frac{C_i(t) -}{B_i(t)}\right)w_i(t) + \sum_{i=1}^{m}\left(\frac{C_i'(t) -}{B_i'(t)}\right)w_i'(t) + \sum_{i=1}^{n}\left(\frac{C_i''(t) -}{B_i''(t)}\right)w_i''(t)$$

where Ci(t), Bi(t), and wi(t) are perceived cost, benefit and weight of the ith cognitive factor respectively; $C_i'(t)$, $B_i'(t)$, and $w_i'(t)$ are perceived cost, benefit and weight of the ith social factor; and $C_i'(t)$, $B_i'(t)$, and $w_i'(t)$ are perceived cost, benefit and weight of the ith relational factor.

A negative PIV indicates that the perceived costs outweigh the perceived benefits (i.e., the individual is less likely to respond to the interruption), whereas positive PIV indicates that the perceived benefits outweigh the perceived costs (i.e., the individual is more likely to respond to the interruption). It is noted that PIV is defined as user's perception and the way user assigns weights to each factor is influenced by how s/he perceives the value of these factors. For example, an interruption may affect the productivity of a current task but if the interruptee perceives the importance/urgency to the interrupter to be of higher weight, then the net PIV of responding to the interruption may be positive. Further, the PIV may or may not be accurate as it is evaluated based on the information available to the interruptee at the time of interruption. For example, an individual receiving a call from a colleague may perceive it to have high work related value and low social value. However, it may be that the colleague may have called to ask if the individual would go to a movie with him. The accuracy of PIV is related to the accuracy of interruption information one has at the time of interruption. The model 200 maximizes the accuracy of PIV by providing relevant information and reducing uncertainty around the unknown relational factors of an interruption. The closer the PIV is to the actual interruption value, the greater the individuals' satisfaction with the decision will be.

EXPERIMENTAL RESULTS

The present invention was utilized in a study which implemented experience sampling methodology (ESM) to assess the validity of key aspects of the present invention. Forty participants were given a Qtek 9100 Windows Mobile cell phone loaded with survey software to be used for a week with their own SIM card and service plan. For each incoming call (answered, ignored intentionally, missed unintentionally), the following data were collected: a) information related to caller identification; b) the level of influence of relational (caller), cognitive (mental state) and social (place and people) contexts on call handling decisions. This study showed that relational context plays an enormous role (87.4%) in call handling decisions unlike the interruptee's current local social (34.9%) or cognitive (43%) contexts (N=834). Single-handedly, relational context influenced decisions 49.5% of the time while social and cognitive context influenced only 9% and 1.8%, respectively. Second, a clear disconnect was shown between the influence of local interrupee-context and relational context in terms of call handling decisions. Relational context did not correlate with either cognitive context (answered calls: Spearman's r=0.039, n=788, p=0.27; ignored calls: Spearman's r=0.072, n=163, p=0.36) or social context (answered calls: Spearman's r=−0.17, n=788, p=0.000; Ignored calls: Spearman's r=−0.26, n=163, p<0.001). Third, individuals engaged in the process of uncertainty reduction in call handling decisions. 35.4% of calls were answered (N=729) to find out what the call was about. These findings confirmed the underlying premises of the framework and its assertion that the localized cognitive and social context on their own lack in providing the necessary subtext to understand and predict people's willingness to be interrupted.

In the foregoing study, the phones were loaded with a survey that consisted of 4-13 questions which varied based on the way an incoming phone call was handled. Incoming calls were differentiated based upon: a) answered calls; b) ignored calls (missed intentionally); and c) missed calls (missed unintentionally). The surveys were triggered and administered as follows: a) immediately after the end of the call for answered calls; b) immediately after a call that was missed; or c) immediately after user hit ignore/silence button for an incoming call. If the survey was not immediately answered due to reasons such as a missed call or other tasks, the survey was programmed to provide audible alert and a visual display of an icon suggesting pending incomplete surveys. In case of multiple missed surveys due to multiple missed calls, the surveys were queued and administered in the order of triggers detected.

A possible limitation of the ESM technique is that questionnaires are typically limited to 1 or 2 minutes so as to not burden the participants, and are typically presented to the subjects a number of times. As a result, a qualitative approach to ESM survey validity was adopted, using pretests and experts' opinion to ensure that a single item scales measure what was desired. Further, subjects were trained and briefed on every single survey question, so that there was no ambiguity in their understanding and responses. Pre-tests showed that the survey took 20-30 seconds to complete for each incoming call.

Subjects were trained and briefed before participating in the study on how to operate the phone and how to adhere to study requirements in providing data, and who to reach in case of problems. A total of 40 subjects were recruited for the ESM study and belong to two major groups: 1) 20 students of a research university; and 2) 20 full-time employees of a fortune 500 company. The majority of the subjects (37) had used cell phones for at least 3 years or more. The student group consisted of 8 undergraduate and 12 graduate full time students who volunteered solely because of their interest in the study. They received no course credit or other reward for participation, other than the chance to use a Pocket PC phone for a week. Nineteen of the subjects were 18-25 years of age and 1 was 36-50 years of age. Eight lived on campus, one held a full-time job, while another eight held part-time jobs. Jobs profiles included nurse, research assistants, tutors and desk assistants.

The full-time working group consisted of 20 adults from diverse professional backgrounds including research scientists, programmers, project managers, system administrators, software engineers, developers, business analysts, network engineers, computer scientists and purchasing staff. Subjects were given raffle tickets for an MP3 player in return for their participation. One subject was 18-25 years of age, 4 were 26-35 years of age, 8 were 36-50 years of age and 6 were 51-65 years of age.

The ESM survey consisted of 3 versions for the three call handling outcomes, namely: missed (unintentional), ignored (intentional), and answered. Survey versions for answered and ignored calls varied slightly from each other to reflect how the call was handled and were divided into the subsections described below. The survey version for missed calls however covered only relevant items in subsections (b) and (d):

a) Identity of the caller: This contained questions regarding their identification of the caller/number;
b) Reasons for call handling outcome/decision: This contained questions regarding their reasons for answering or missing or ignoring a call. Participants were also explicitly asked to rank reasons pertaining to relational (caller), cognitive/personal (mental state of mind) and social contexts (activity/place/people around) in terms of the level of influence they had in their call handling outcome/decision;
c) Call handling decision in case of a different caller ID: This contained questions how they would have handled the call if it were from somebody else and the reasons influencing the decision; and
d) Satisfaction with call handling outcome/decision: This contained questions on participant's satisfaction with the way the call was handled and how they would have liked to handle it if they were dissatisfied with the current choice.

The phones recorded a total of 1201 incoming calls for which ESM surveys were answered. The number of incoming calls that went directly to voicemail (typically received when the phone was switched off) is unknown. Data were collected from participants for an average of 6 days, as phone use varied from one person to another. One subject reported not using the phone at all after the first day, and another subject was unable to send the data due to his current location constraints.

These two subjects were dropped from the study, and the data from the remaining 38 subjects was utilized.

All calls resulted in three categories of call handling outcomes: 65.6% of the calls were answered, 13.6% were ignored intentionally and 20.8% were missed unintentionally. Majority of the calls (79.1%) were intentionally handled while 20.8% of the calls were handled unintentionally. These results are shown in the graphs 220-222 of FIG. 6. Of the calls answered, 92.5% (729) of the callers were identified. Participants reported answering the calls for the following reasons: 1) expecting the call (42.2%); 2) wanting to know why they were called (35.4%); 3) 16.5% of the time they reported having answered because they had some idea of what the call was about; 4) obligation (7.4%); and 5) closeness to the caller (24.7%). Other reasons included the caller's call patterns such as time, length of calls, frequency, etc.

Participants reported being happy with the way the calls were handled 86% of the time. Specifically, with regard to intentional call handling decisions, participants reported being happy 96.7% of the times they answered calls and 97% when they ignored them. However, when the call handling outcome resulted in missed calls (unintentional), they reported being unhappy 52.4% of the time. This shows that participants were largely unhappy when decision was not deliberate.

Since 52.4% of the missed calls resulted in participants being unhappy, we decided to look at the reasons provided for having missed a call unintentionally. Participants reported that 32% of unhappy missed calls resulted due the ringer being turned off, 524 due to not hearing the ring or feeling the vibration. Other reasons reported included hanging up accidentally, away from the phone, unable to reach the phone on time, calling party hanging up, currently on another call and driving.

When asked how they would have liked to have handled these missed calls, they wished to have been notified of the incoming call 83.2% of the time, wished it went to the voicemail 9.2% of the time, and wished they had known who the caller was but not have to pick up 5.3% of the time. They almost never (0.8%) wished they could have blocked it completely. Other reasons included better physical access to cell phone such a convenient place to hold the phone, and have an easier way to pull out phone from holder without hanging up.

When participants made an intentional call handling decision to either answer or ignore a call, we asked them to what level their decision was influence by (0—no influence, 1—least and 3—most influence) the three factors representing the three contexts namely:

1) Caller (relational);
2) My mental state of mind (cognitive); and
3) My activity/place/people around me (social).

Figure 7:
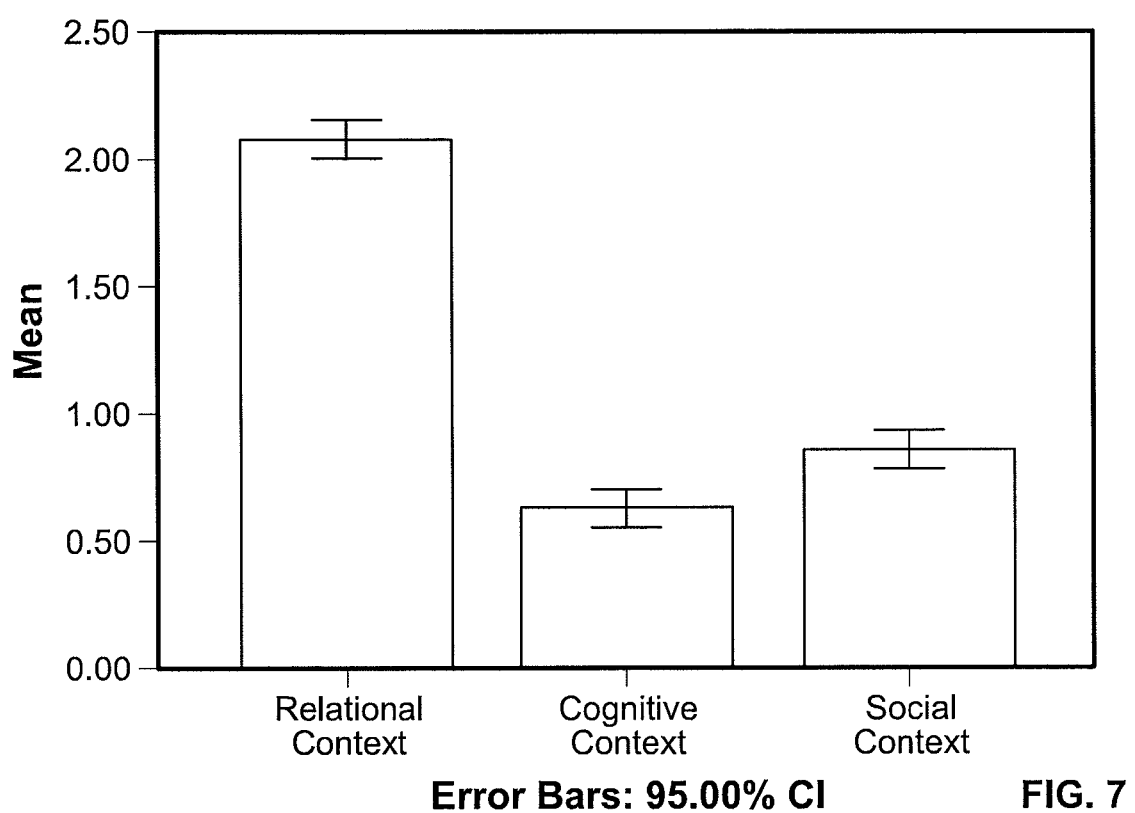

FIG. 7 shows the significant difference in strength of influence of these three factors, with relational context being most twice as important as either social or cognitive factors.

Figure 8:
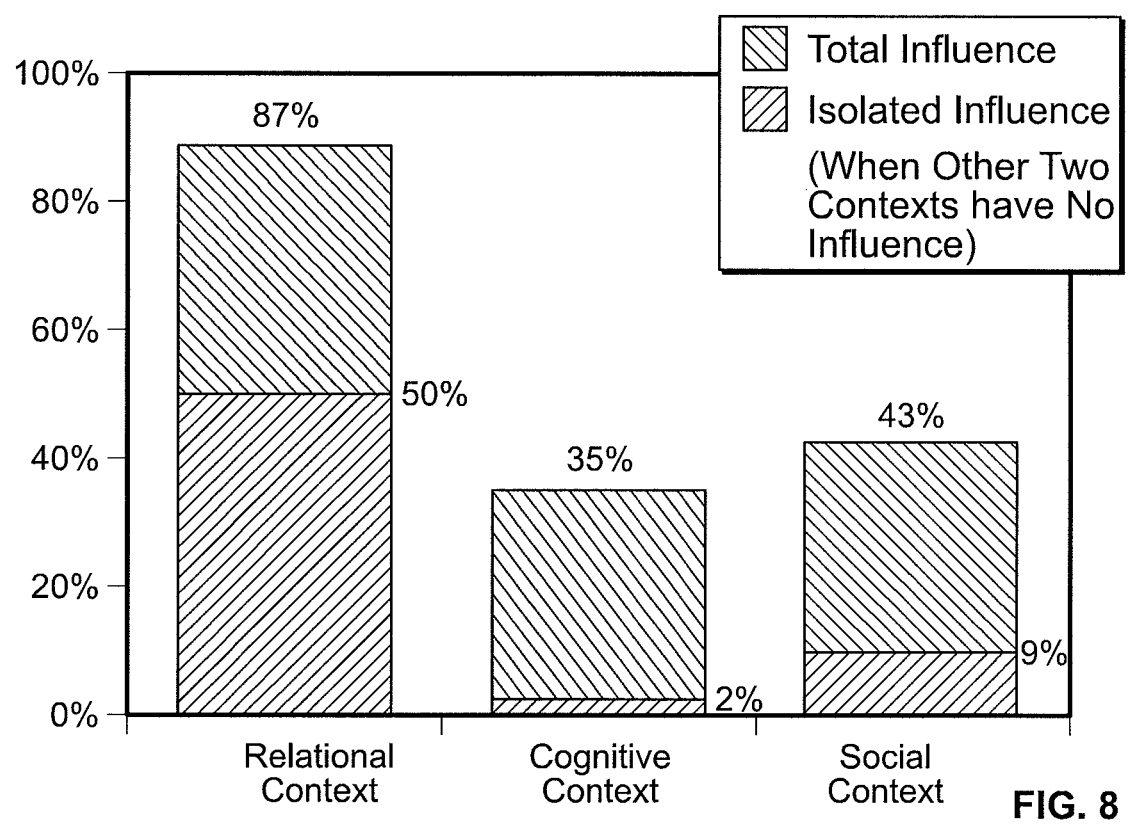

Of the 951 intentionally handled calls, 117 calls were reported to have no influence from any of these factors. For the remaining 834 calls, participants reported that the caller influenced their decisions 87.4%, their mental state of mind influenced 34.9% and the place/activity/people around 43% 1. Clearly, the caller played a very important role in their call handling decisions. Further, 49.5% of the time participants reported the caller alone influenced their call handling decisions. In contrast, the level of influence cognitive and social factors on their own was limited to only 1.8% and 9% respectively. These results are shown in FIG. 8. In particular, 51.9% of the times caller alone influence the decision to answer a call and 37% of the time in the decision to ignore a call. For answered calls, cognitive context was used in isolation 0.7% of the time and social context 6.3%. For ignored calls, cognitive context was used in isolation 7.4% of the time and social context 23%. It is noted that, since participants were asked to rate the influence of each context, percentages do not add up to a 100%.

The correlations between the three contexts were examined for answered and ignored calls. For answered calls, the relational context did not correlate with either cognitive context (Spearman's rho=0.039, n=788, p=0.27) or social context (Spearman's rho=−0.17, n=788, p<0.0001). However, social and cognitive context correlated highly (Spearman's rho=0.584, n=788, p<0.0001). Similarly for ignored calls, the relational context did not correlate with either cognitive context (Spearman's rho=0.072, n=163, p=0.36) or social context (Spearman's rho=−0.26, n=163, p<0.001). Contrary to the answered calls, social and cognitive context were not correlated (Spearman's rho=0.115, n=163, p=0.145) in the case of ignored calls.

The foregoing study confirms that relational context influences interruption management decisions more than the social and cognitive contexts. Further, the data suggests that social and cognitive factors are sparingly (less than 9%) used in isolation and are used in conjunction with the relational context. This is not surprising as people are fundamentally social beings and interruptions in the form of interpersonal communication are handled on relationship by relationship basis rather than the social and cognitive context one is in.

Further, it was also found that relational context had no strong correlation with cognitive and social context. This indicates a clear disconnect between the influence of local interrupee-context and relational context in terms of call handling decisions. This supports the argument that the localized cognitive and social context on their own lack in providing the necessary subtext to understand and predict people's willingness to be interrupted.

The findings of the foregoing study not only provide empirical evidence of how the cognitive and social interruptability paradigms used in previous work underplay the role of the relational context (who is calling and about what), but also revealed that relational context plays an enormous role in everyday interruption management practices. These results suggest that dramatic improvements in interruption management are likely to come from the provision of tools that leverage social relationship data rather than complicated inference from sensors about the social and/or cognitive context.

In the foregoing study, it was found that the majority (79%) of the calls were handled intentionally by answering or ignoring. On encountering unintentionally missed calls, participants reported being unhappy more than 50% of the time and expressed a desire to be made aware of an incoming call at the very least. This suggests that the users may prefer deliberation of costs and benefits of their call handling decisions rather than have an agent control or filter their incoming interruptions. Further, it was seen that more than half these missed calls (54%) resulted from the not being able to hear/feel the vibration and more than one third (32%) from the ringer being turned off. It was also seen that individuals engaged in the process of uncertainty reduction in call handling decisions where 35.4% (N=729) of identified calls were answered to find out what the call was about.

Having thus described the invention in detail, it is to be understood that the foregoing description is not intended to limit the spirit or scope thereof. What is desired to be protected is set forth in the following claims.

What is claimed is:

1. A system for previewing calls in a communications system, comprising:
   a first communications device operated by a sender, the first communications device executing first call preview code for allowing the sender to provide relational context information relating to a call; and
   a second communications device operated by a receiver, the second communications device executing second call preview code for receiving the relational context information from the sender and displaying the relational context information to the receiver, the second communications device configured to provide a survey related to the call to the receiver in response to the call being received by the second communications device,
   wherein the first communications device executes the first call preview code to transmit interaction history information between the sender and the receiver with the call, the interaction history information being gathered from previously captured data,
   wherein the receiver can decide how to respond to the call from the sender based upon the relational context information, and
   wherein the second communications device provides the survey to the receiver independent of whether the receiver responds to the call.

2. The system of claim 1, wherein the first call preview code generates a first graphical user interface screen on the first communications device for allowing the sender to input the relational context information.

3. The system of claim 2, wherein the relational context information comprises information identifying a subject of the call.

4. The system of claim 2, wherein the relational context information comprises information identifying the sender.

5. The system of claim 2, wherein the relational context information comprises information identifying the sender's location.

6. The system of claim 2, wherein the relational context information comprises information identifying an activity in which the sender is currently engaged.

7. The system of claim 2, wherein the relational context information comprises information about a length of the call.

8. The system of claim 2, wherein the relational context information comprises an indication of urgency of the call.

9. The system of claim 2, wherein the relational context information comprises an indication of importance of the call.

10. The system of claim 2, wherein the relational context information comprises information about the sender's mood.

11. The system of claim 2, wherein the relational context information comprises information about individuals surrounding or near the sender.

12. The system of claim 2, wherein the second call preview code generates a second graphical user interface screen on the second communications device for displaying the relational context information to the receiver.

13. The system of claim 12, wherein the second call preview code allows the receiver to generate and transmit a response to the sender.

14. The system of claim 12, wherein the second call preview code generates a third graphical user interface screen on the second communications device for allowing the receiver to participate in the survey relating to the call.

15. The system of claim 1, wherein the first communications device communicates with the second communications device over a wired network.

16. The system of claim 1, wherein the first communications device communicates with the second communications device over a wireless network.

17. A method for previewing calls in a communications system, comprising the steps of:
   displaying a first user interface screen on a first communications device operated by a sender in a communications network;
   allowing the sender to provide relational context information relating to a call using the first user interface screen;
   initiating a call between the sender and a receiver in the communications network;
   transmitting the relational context information to a second communications device operated by the receiver;
   displaying the relational context information to the receiver in a second user interface screen generated by the second communications device;
   allowing the receiver to decide how to respond to the call based upon the relational context information; and
   providing a survey relating to the call to the receiver in response to the call being received by the receiver, the survey being displayed to the receiver by the second communications device,
   wherein the first communications device transmits interaction history information between the sender and the receiver with the call, the interaction history information being gathered from previously captured data,
   wherein the survey is provided to the receiver independent of whether the receiver responds to the call.

18. The method of claim 17, wherein the step of allowing the sender to provide relational context information comprises allowing the sender to input information identifying a subject of the call.

19. The method of claim 17, wherein the step of allowing the sender to provide relational context information comprises allowing the sender to input information identifying the sender.

20. The method of claim 17, wherein the step of allowing the sender to provide relational context information comprises allowing the sender to input information identifying the sender's location.

21. The method of claim 17, wherein the step of allowing the sender to provide relational context information comprises allowing the sender to input information identifying an activity in which the sender is currently engaged.

22. The method of claim 17, wherein the step of allowing the sender to provide relational context information comprises allowing the sender to input information about a length of the call.

23. The method of claim 17, wherein the step of allowing the sender to provide relational context information comprises allowing the sender to input an indication of urgency of the call.

24. The method of claim 17, wherein the step of allowing the sender to provide relational context information comprises allowing the sender to input an indication of importance of the call.

25. The method of claim 17, wherein the step of allowing the sender to provide relational context information comprises allowing the sender to input information about the sender's mood.

26. The method of claim 17, wherein the step of allowing the sender to provide relational context information comprises allowing the sender to input information about individuals surrounding or near the sender.

27. The method of claim 17, further comprising allowing the receiver to generate and transmit a response to the sender using a third user interface screen generated by the second communications device.

28. The method of claim 27, further comprising generating a fourth user interface screen on the second communications device for allowing the receiver to participate in the survey relating to the call.

29. A non-transitory computer-readable medium holding computer executable instructions that, when executed by a processor, cause a receiver communications device to execute the steps of:
   receiving relational context information from a sender communications device in a communications network relating to a call;
   displaying the relational context information in a user interface screen on the receiver communications device; and
   providing a survey relating to the call to the receiver in response to the call being received by the receiver communications device, the survey being displayed to the receiver by the receiver communications device,
   wherein the receiver communications device receives interaction history information between the sender and the receiver transmitted to the receiver communication device from the sender communications device with the call, the interaction history information being gathered from previously captured data,
   wherein the receiver can decide how to respond to the call based upon the relational context information, and
   wherein the survey is provided to the receiver independent of whether the receiver responds to the call.

30. The non-transitory computer-readable medium of claim 29, wherein the computer-readable medium further comprises instructions for instructing the communications device to display a second user interface screen for allowing the receiver to participate in a survey relating to the call.

31. The non-transitory computer-readable medium of claim 29, wherein the computer-readable medium further comprises instructions for instructing the communications device to allow the receiver to generate and transmit a response to the sender.

32. The non-transitory computer-readable medium of claim 29, wherein the relational context information comprises information identifying a subject of the call.

33. The non-transitory computer-readable medium of claim 29, wherein the relational context information comprises information identifying the sender.

34. The non-transitory computer-readable medium of claim 29, wherein the relational context information comprises information identifying the sender's location.

35. The non-transitory computer-readable medium of claim 29, wherein the relational context information comprises information identifying an activity in which the sender is currently engaged.

36. The non-transitory computer-readable medium of claim 29, wherein the relational context information comprises information about a length of the call.

37. The non-transitory computer-readable medium of claim 29, wherein the relational context information comprises an indication of urgency of the call.

38. The non-transitory computer-readable medium of claim 29, wherein the relational context information comprises an indication of importance of the call.

39. The non-transitory computer-readable medium of claim 29, wherein the relational context information comprises information about the sender's mood.

40. The non-transitory computer-readable medium of claim 29, wherein the relational context information comprises information about individuals surrounding or near the sender.

41. The system of claim 1, wherein the second communications device executes the second call preview code to display interaction history information between the sender and the receiver, the interaction history information being gathered from previously captured data.

42. The system of claim 1, wherein content of the survey is different depending on a disposition of the call by the receiver.

\* \* \* \* \*